(12) United States Patent
Wang et al.

(10) Patent No.: US 7,217,011 B2
(45) Date of Patent: May 15, 2007

(54) AIR FLOW CHANNEL

(75) Inventors: Cheng Wang, Miaoli County (TW); Tsung-Ching Lin, Miaoli County (TW); Lu-Wen Chien, Miaoli County (TW)

(73) Assignee: Coretronic Corporation, Miaoli County (TW)

( * ) Notice: Subject to any disclaimer, the term of this patent is extended or adjusted under 35 U.S.C. 154(b) by 227 days.

(21) Appl. No.: 11/014,963

(22) Filed: Dec. 20, 2004

(65) Prior Publication Data

US 2006/0061996 A1 Mar. 23, 2006

(30) Foreign Application Priority Data

Sep. 23, 2004 (TW) .............................. 93128900 A

(51) Int. Cl.
*F21V 29/00* (2006.01)
(52) U.S. Cl. ........................ 362/345; 362/294; 362/373
(58) Field of Classification Search ................ 362/294, 362/373, 96, 345
See application file for complete search history.

(56) References Cited

U.S. PATENT DOCUMENTS

| | | | |
|---|---|---|---|
| 6,402,346 B1 * | 6/2002 | Liao et al. ................... | 362/294 |
| 6,693,381 B2 | 2/2004 | Bell et al. | |
| 2003/0076683 A1 * | 4/2003 | Chang ......................... | 362/294 |
| 2003/0179579 A1 * | 9/2003 | Hsu et al. .................... | 362/294 |
| 2005/0225963 A1 * | 10/2005 | Huang et al. .................. | 362/96 |
| 2006/0056181 A1 * | 3/2006 | Wang et al. ................ | 362/294 |

* cited by examiner

*Primary Examiner*—Stephen Husar
*Assistant Examiner*—Peggy A. Neils
(74) *Attorney, Agent, or Firm*—Rosenberg, Klein & Lee

(57) ABSTRACT

An air flow channel is used to direct cooling air towards a lamp reflector. The air flow channel has an outer housing and a guider. The outer housing is positioned at the outlet of blower, which is designed to dissipate heat from the lamp reflector. The guider, which is mounted at the side of the outer housing, has an upper slanted surface, a lower slanted surface and a side slanted surface. The air flow is divided into three individual air flows towards the lamp reflector by means of the three slanted surfaces.

7 Claims, 4 Drawing Sheets

AIR FLOW CHANNEL

RELATED APPLICATIONS

The present application is based on, and claims priority from, Taiwan Application Serial Number 93128900, filed Sep. 23, 2004, the disclosure of which is hereby incorporated by reference herein in its entirety.

BACKGROUND OF THE INVENTION

1. Field of Invention

The invention relates to a cooling device and, in particular, to an air flow channel.

2. Description of the Prior Art

FIG. 1 shows the cooling method for a conventional projector lamp. Normally, a blower 800 directly blows cooling air into the lamp reflector 700, taking away heat generated by the projector lamp 500. The cooling places of the projector lamp 500 are mainly the high-temperature points above and below the filament 510, the soldering point 520, and the end points 530. Each high-temperature point has to be controlled within a certain temperature range. Aside from the projector lamp 500, the lamp reflector 700 has to be cooled below a predetermined temperature in order to prevent the lamp reflector from breaking. Using the conventional cooling method on the projector lamp 500, the cooling air has a directly impact on the projector lamp 500 instead of cooling each of the high-temperature points according to the required temperature ranges. Moreover, the cooling air first flows by the end point 530, the soldering point 520, and the filament 510 and absorbs their heat before reaching the bottom of the lamp reflector 700. However, these high-temperature points have temperatures higher than the bottom of the lamp reflector 700. The cooling air after absorbing heat from them is very difficult to further cool down the bottom of the lamp reflector 700. If one solves the problem by increasing the fan speed, the temperatures are those high-temperature points will be lowered too much out of the required ranges. This method of first cooling down the high-temperature points with higher temperatures before cooling down the lamp reflector has the drawback that when the temperature of the lamp reflector becomes too high, adjusting the fan speed to lower the temperature of the lamp reflector will render the temperature of the filament out of the specific range. This makes the temperature control very difficult.

As described, the prior art results in non-uniform cooling on different parts of the projector lamp 500 and the lamp reflector 700 or cannot cool the system in such a way that the projector lamp 500 and the lamp reflector 700 fall right within the desired temperature ranges. These effects will affect the performance and lifetime of the projector lamp and the lamp reflector. Thus, it is desirable to provide a better cooling system.

SUMMARY OF THE INVENTION

An objective of the invention is to provide an air flow channel, which directs cooling air to flow along the upper and lower parts of the metal coating of the lamp reflector so that the cooling air first cools the bottom of the lamp reflector before cooling the high-temperature points above and blow the projector lamp filament.

Another objective of the invention is to provide an air flow channel to direct cooling air toward the high-temperature points such as the end point and soldering point of the projector lamp without blowing the side surface of the filament.

To achieve the above objective, the disclosed air flow channel includes an outer housing and a guider. The outer housing is positioned at the outlet of blower, which is designed to dissipate heat from the lamp reflector. The guider, which is mounted on one side of the outer housing, has an upper slanted surface, a lower slanted surface and a side slanted surface. The upper slanted surface tilts upward from the central part of the guider to the upper part of the outlet of outer housing. The side slanted surface tilts sideways from the central part of the guider to the other side of the outlet of outer housing. The lower slanted surface tilts down from the central part of the guider to the lower part of the outlet of outer housing. The air flow is divided into three individual air flows towards the lamp reflector by means of the three slanted surfaces.

When the upper and lower air flows enter the lamp reflector, they flow along the upper and lower part of the lamp reflector. They first cool the lamp reflector before flowing toward the projector lamp to cool the high-temperature points above and below the filament. The side air flow passes the soldering point and the end point to bring down their temperature without directly blowing at the side surface of the filament.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE PREFERRED EMBODIMENT

The present invention will be apparent from the following detailed description, which proceeds with reference to the accompanying drawings, wherein the same references relate to the same elements.

Figure 1:
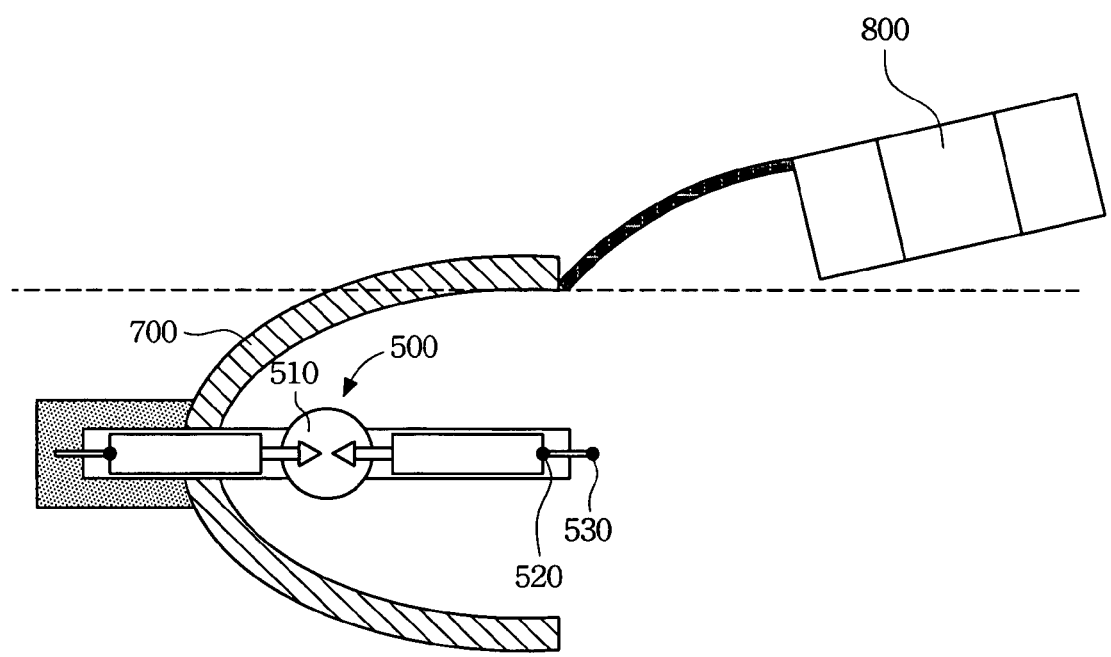
FIG. 1 is a schematic view of the conventional cooling method for a projector lamp.
Figure 2A:
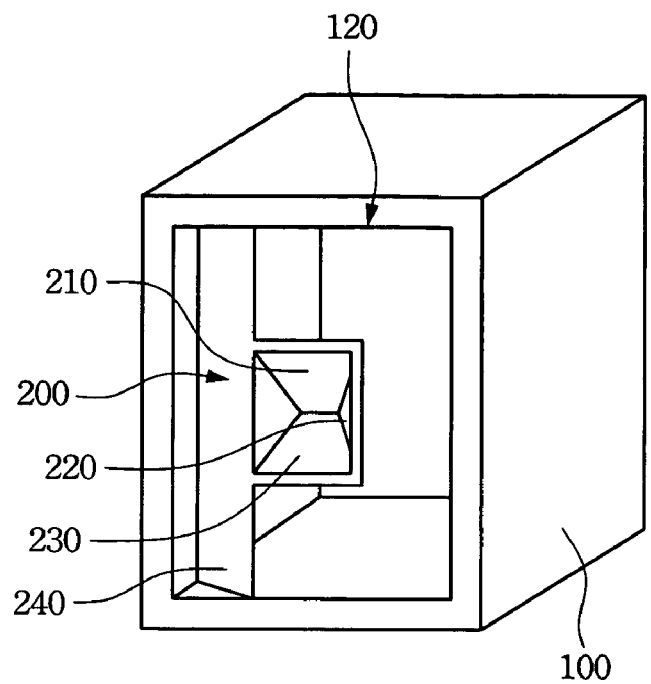
FIG. 2A is a three-dimensional view of one side of the outlet of blower in a preferred embodiment of the disclosed air flow channel.
Figure 2B:
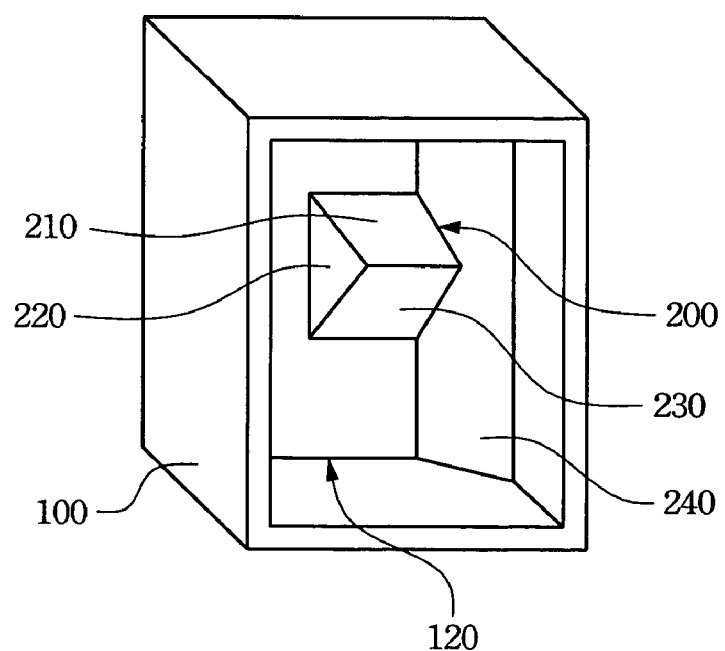
FIG. 2B is a three-dimensional view of the other side of the outlet of blower in a preferred embodiment of the disclosed air flow channel.

As shown in FIGS. 2A and 2B, the disclosed air flow channel contains an outer housing 100 and a guider 200. The guider 200 is located on one side of the outlet of blower 120, including an upper slanted surface 210, a side slanted surface 220, and a lower slanted surface 230. The upper slanted surface 210 tilts upward from the central part of the guider 200 to the upper part of the outlet of outer housing 120. The side slanted surface 220 tilts sideways from the central part of the guider 200 to the other side of the outlet of outer housing 120. The lower slanted surface 230 tilts down from the central part of the guider 200 to the lower part of the outlet of outer housing 120. The air flow is divided into three individual air flows towards the lamp reflector by means of the three slanted surfaces. The guider 200 further includes a compressing slanted surface 240 to reduce one side of the outlet of blower 120, forcing cooling air to flow toward the upper, side, and lower slanted surfaces 210, 220, 230.

Figure 3A:
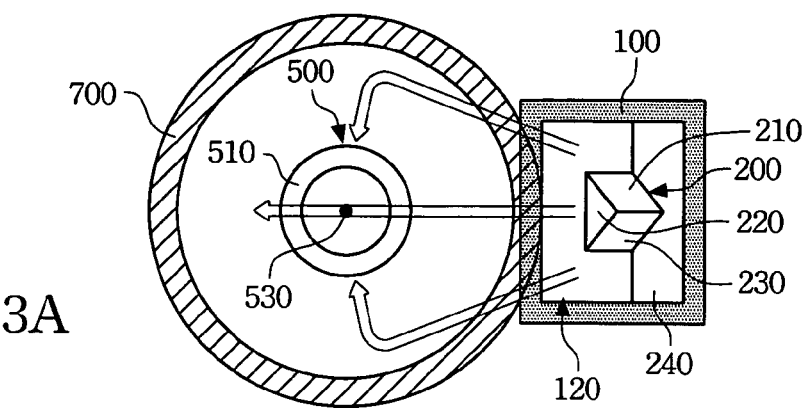
FIG. 3A is a front view of the lamp reflector in the preferred embodiment of the invention.

A preferred embodiment of the invention is shown in FIG. 3A. It shows a front view of the lamp reflector 700 and what are the relations between the upper, side, and lower slanted surfaces 210, 220, 230 and the cooling air flow directions. As shown in the drawing, the outer housing 100 is mounted on one side of the lamp reflector 700. The cooling air blows through the outer housing 100. With the guidance of the upper, side, and lower slanted surfaces 210, 220, 230, upper, side, and lower flows are formed and directed toward the lamp reflector 700.

Figure 3B:
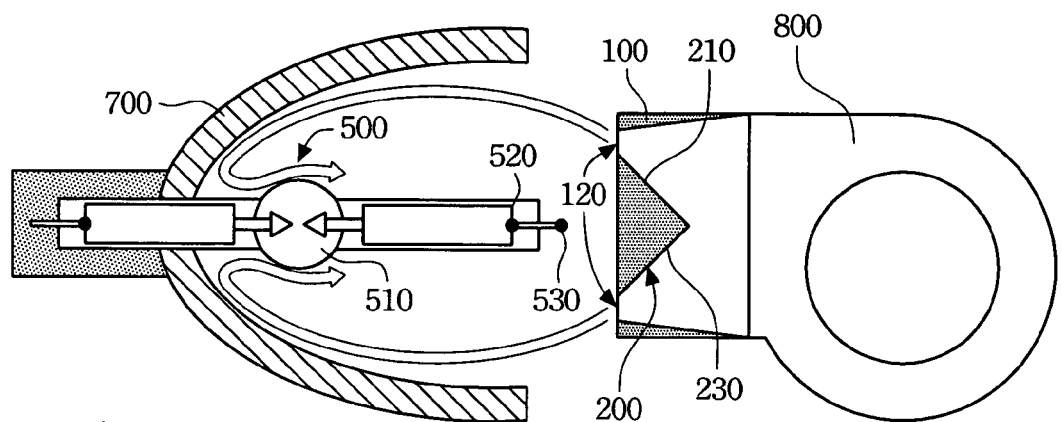
FIG. 3B is a side view of FIG. 3A.

As shown in FIG. 3B, the outer housing 100 is located at the outlet of the blower 800. The cooling air from the blower 800 is directed by the upper slanted surface 210 and the lower slanted surface 230 of the guider 200 to form upper and lower air flows, flowing out of the outlet 120 of the outer housing 100 toward the lamp reflector. The air flows then flow along the inner walls of the lamp reflector 700 to cool the lamp reflector 700 that has a smaller temperature increase. When the air flows reach the bottom of the lamp reflector 700, the cooling air flows from the bottom of the lamp reflector 700 along the projector lamp 500 to the upper and lower parts of the filament 510 under the influence of air pressure. The heat above and below the filament 510 is thus taken away, cooling down the filament 510 that has a larger temperature increase. Afterwards, the cooling air flows toward the opening of the lamp reflector 700, dissipating the absorbed heat.

Figure 3C:
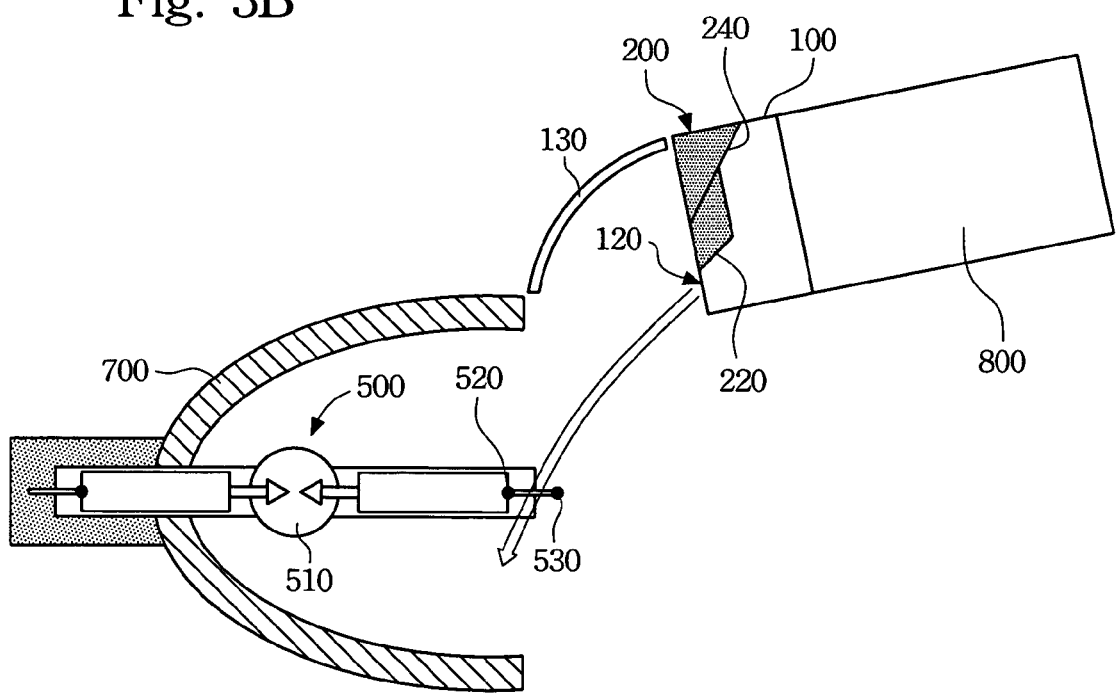
FIG. 3C is a top view of FIG. 3A.

As shown in FIG. 3C, with the guidance of the side slanted surface 220 of the guider 200, part of the cooling air forms a side air flow to flow sideways toward the outlet 120 of the outer housing 100. The cooling air thus flows toward the soldering point 520 and the end point 530, dissipating heat produced by them.

The places to be cooled on the projector lamp 500 are above and below the filament 510, the soldering point 520, and the end point 530 that have high temperatures. The side air flow formed by the guidance of the side slanted surface 220 from the guider 200 mostly flows to the soldering point 520 and the end point 530, without directly flowing toward the side surface of the filament 510. This does not only cool down the soldering point 520 and the end point 530, but also avoid over-cooling the filament 510. The cooling of the filament 510 mainly relies on the upper air flow and the lower air flow, flowing toward the desired upper and lower parts of the filament 510, respectively. Moreover, the upper air flow and the lower air flow first flow along the inner walls of the lamp reflector 700, cooling the lamp reflector 700 that has a smaller temperature increase, before reaching the filament 510 to cool down that part with a larger temperature increase. This mechanism makes efficient use of the cooling air to achieve better cooling effects. Moreover, when part of the filament has to high temperatures, one can adjust the fan speed to control the filament temperature within a certain range. At the same time, the lamp reflector 700 can be cooled below a predetermined temperature to prevent it from high-temperature damage. Therefore, the disclosed mechanism can quickly maintain the temperature of the lamp within a desired range.

Various kinds of modifications can be done within the scope of the invention. For example, the outer housing 100 can be directly formed on the blower 800 or be independently formed to couple with the blower 800. Likewise, the guider 200 can be directly formed on the outer housing 100 or be independently formed to couple with the outer housing 100.

For the purpose of illustration, the outer housing 100 and the guider 200 are roughly symmetric. However, their shapes, sizes, positions, and tilting angles can be adjusted to change the shapes, sizes, positions, and tilting angles of the slanted surfaces 210, 220, 230, and the shapes, sizes, positions, and tilting angles of the compressing slanted surface 240. Accordingly, the flowing direction, flux, and pressure of the upper, side, and lower air flows are changed to meet the different temperature range requirements of the projector lamp 500 and the lamp reflector 700 and the restriction of the projector internal space.

Figure 4:
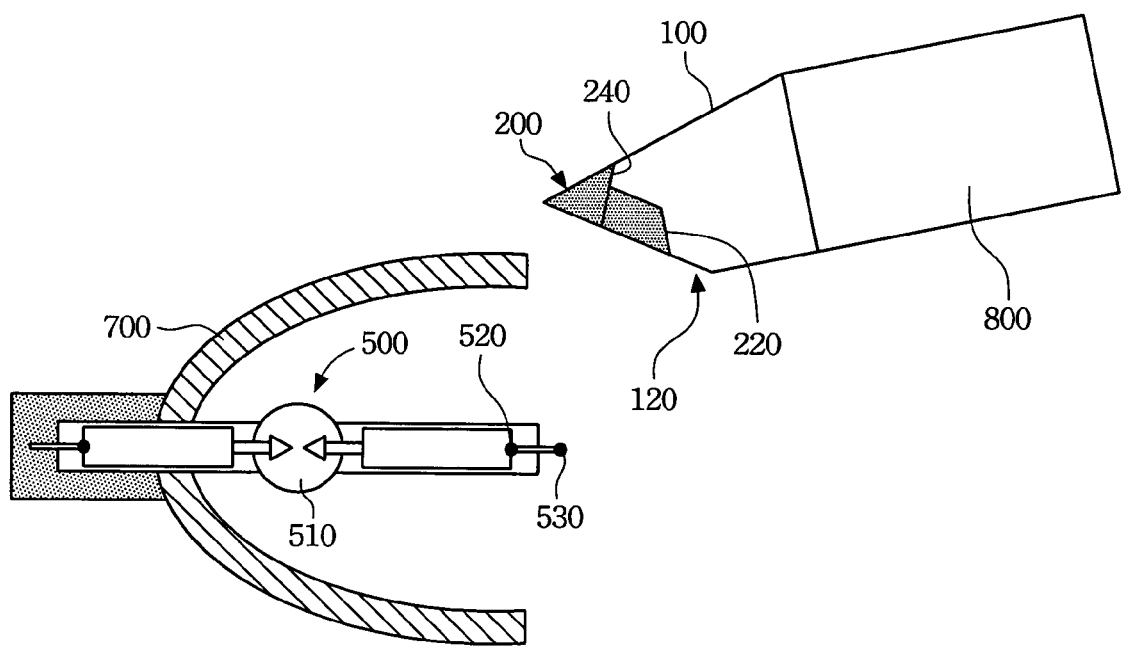
FIG. 4 is a top view of another embodiment of the invention where the outlet of blower is extended to the border of the lamp reflector.

As shown in FIG. 3C, an assistant outer housing 130 can be installed between the outlet of outer housing 120 and the lamp reflector 700 to guide most of the cooling air toward the lamp reflector. As shown in FIG. 4, the outlet of outer housing 120 is further extended to the border of the lamp reflector 700, forcing most of the cooling air to maintain the air pressure at the outlet of outer housing 120 toward the lamp reflector 700. This makes more efficient use of the cooling air.

The above descriptions refer to the configuration that the disclosed air flow channel is installed on the right-hand side of the lamp reflector 700 when viewed from its front. However, the same effects can be achieved by installing the disclosed air flow channel on the other side of the lamp reflector 700. Thus, such variations should be included in the scope of the invention too.

From the disclosed embodiment, we see that the invention has the following advantages:

1. When the cooling air is guided by the air flow channel into the lamp reflector, it flows along the upper and lower parts of the lamp reflector to first cool the lamp reflector before reaching the high temperatures above and below the projector lamp filament. The cooling air is efficiently used to enhance the cooling of the projector lamp and the lamp reflector.

2. When the cooling air is guided by the air flow channel toward the high-temperature points of the end point and soldering point, it does not flow toward the side surface of the filament and avoids over-cooling the filament. The invention can thus increase the performance and lifetime of the projector lamp.

3. The shapes, sizes, positions, and tilting angles of the outer housing and the guider can be adjusted to change the shapes, sizes, positions, and tilting angles of the slanted surfaces 210, 220, 230, and the shapes, sizes, positions, and tilting angles of the compressing slanted surface 240. Accordingly, the flowing direction, flux, and pressure of the upper, side, and lower air flows are changed to meet the different temperature range requirements of the projector lamp and the lamp reflector and the restriction of the projector internal space.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An airflow channel to direct air toward a lamp reflector comprising:

an outer housing located at an outlet of a blower on one side of the lamp reflector with an outlet of the outer housing pointing toward the lamp reflector for the cooling air to flow toward the lamp reflector; and a guider located on one side of the outlet of the outer housing including:

an upper slanted surface tilting upward from the central part of the guider to the upper part of the outlet of the outer housing;

a side slanted surface tilting sideways from the central part of the guider to the other side of the outlet of the outer housing;

a lower slanted surface tilting downward from the central part of the guider to the lower part of the outlet of the outer housing; and a compressing slanted surface shrinking one side of the outlet of the outer housing, forcing the cooling air toward the slanted surfaces;

wherein the cooling air is directed to form an upper air flow, a side air flow, and a lower air flow, all toward the lamp reflector, with the guidance of the slanted surfaces.

2. The air flow channel of claim 1, wherein the outer housing is directly formed at the outlet of the blower.

3. The air flow channel of claim 1, wherein the outer housing is independently formed and then couples with the blower.

4. The air flow channel of claim 1, wherein the guider is directly formed on the outlet of the outer housing.

5. The air flow channel of claim 1, wherein the guider is independently formed and then couples with the outlet of the outer housing.

6. The air flow channel of claim 1, wherein the outer housing further contains an assistant outer housing between the outlet of the outer housing and the lamp reflector to direct the cooling air toward the lamp reflector.

7. The air flow channel of claim 1, wherein the outlet of the outer housing is extended to the border of the lamp reflector to direct the cooling air toward the lamp reflector.

* * * * *